(12) United States Patent
Dugan et al.

(10) Patent No.: US 11,778,562 B2
(45) Date of Patent: Oct. 3, 2023

(54) METHODS AND APPARATUS FOR REDUCING MOBILE TELEPHONE POWER CONSUMPTION AND/OR RADIATION EXPOSURE

(71) Applicant: Dugan Patents, LLC, Sleepy Hollow, NY (US)

(72) Inventors: Brian M. Dugan, Sleepy Hollow, NY (US); Valerie G. Dugan, Sleepy Hollow, NY (US)

(73) Assignee: Dugan Patents, LLC, Sleepy Hollow, NY (US)

( * ) Notice: Subject to any disclaimer, the term of this patent is extended or adjusted under 35 U.S.C. 154(b) by 0 days.

(21) Appl. No.: 17/522,881

(22) Filed: Nov. 9, 2021

(65) Prior Publication Data

US 2022/0070787 A1 Mar. 3, 2022

Related U.S. Application Data

(63) Continuation of application No. 16/236,637, filed on Dec. 30, 2018, now Pat. No. 11,202,262.

(60) Provisional application No. 62/612,422, filed on Dec. 30, 2017.

(51) Int. Cl.
*H04W 52/02* (2009.01)
*H04B 1/3827* (2015.01)

(52) U.S. Cl.
CPC ....... *H04W 52/0245* (2013.01); *H04W 52/02* (2013.01); *H04W 52/0258* (2013.01); *H04B 1/3838* (2013.01)

(58) Field of Classification Search
CPC ............. H04W 52/0245; H04W 52/02; H04W 52/0258; H04B 1/3838

USPC .......................................................... 455/574
See application file for complete search history.

(56) References Cited

U.S. PATENT DOCUMENTS

| 5,414,861 | A | * | 5/1995 | Horning | G06F 1/30 |
| | | | | | 714/22 |
| 11,284,825 | B2 | * | 3/2022 | Dugan | A61B 5/02438 |
| 2010/0009643 | A1 | * | 1/2010 | Haartsen | H04W 52/0251 |
| | | | | | 455/127.5 |
| 2010/0048239 | A1 | | 2/2010 | Matsumoto | |
| 2010/0104309 | A1 | * | 4/2010 | Ferlitsch | G03G 15/5004 |
| | | | | | 399/70 |

(Continued)

OTHER PUBLICATIONS

Non-Final Office Action of U.S. Appl. No. 16/236,637 dated Jun. 3, 2019.

(Continued)

*Primary Examiner* — April G Gonzales
(74) *Attorney, Agent, or Firm* — Dugan & Dugan, PC

(57) ABSTRACT

In some embodiments, a method of reducing power consumption by a mobile telephone includes (1) providing a mobile telephone including a processor, an antenna, and a memory having computer program code; and (2) employing the processor of the mobile telephone and computer program code to (a) determine if the mobile telephone is in a vehicle; and (b) in response to the mobile telephone being in a vehicle, initiate a reduced power sequence in which the mobile telephone repeatedly turns off transmission by the antenna of the mobile telephone for a first time period and turns on transmission by the antenna of the mobile telephone for a second time period. Numerous other aspects are provided.

20 Claims, 6 Drawing Sheets

(56) References Cited

U.S. PATENT DOCUMENTS

| | | | | |
|---|---|---|---|---|
| 2011/0188398 | A1* | 8/2011 | Baba | H04W 40/16 370/252 |
| 2011/0211564 | A1* | 9/2011 | Yoneyama | H04W 52/0251 370/338 |
| 2011/0237202 | A1* | 9/2011 | Uemura | H04W 36/0088 455/67.14 |
| 2011/0279366 | A1* | 11/2011 | Lohbihler | B25J 13/089 702/158 |
| 2012/0063553 | A1* | 3/2012 | Carwana | H04B 7/0857 455/334 |
| 2012/0156987 | A1* | 6/2012 | Nakayama | H04W 56/00 455/13.2 |
| 2013/0109323 | A1* | 5/2013 | Ruutu | H04W 52/0225 455/68 |
| 2013/0157571 | A1* | 6/2013 | Wondka | H04W 52/0245 455/41.2 |
| 2013/0237204 | A1* | 9/2013 | Buck | G01S 19/16 455/418 |
| 2015/0215793 | A1* | 7/2015 | Siomina | H04W 64/00 455/456.1 |
| 2016/0021660 | A1* | 1/2016 | Krishnamurthy | H04W 68/02 455/452.1 |
| 2016/0037550 | A1* | 2/2016 | Barabell | H04B 17/318 455/450 |
| 2016/0057673 | A1* | 2/2016 | Komura | H04W 36/14 370/331 |
| 2017/0111520 | A1* | 4/2017 | Bowers | G06F 21/32 |
| 2018/0098404 | A1* | 4/2018 | Hall | H05B 45/00 |
| 2019/0208472 | A1* | 7/2019 | Dugan | H04W 52/0245 |
| 2022/0269264 | A1* | 8/2022 | Corbett | B60W 30/09 |
| 2022/0311489 | A1* | 9/2022 | Rakib | H04L 25/0226 |
| 2023/0068437 | A1* | 3/2023 | Narayanan | H04W 24/02 |

OTHER PUBLICATIONS

Ben Reid, "How To Schedule Airplane Mode on iPhone to Toggle on and Off Automatically," https://www.redmondpie.com/how-to-schedule-airplane-mode-on-iphone-to-toggle-on-and-off-automatically/, Feb. 24, 2013.

Sep. 3, 2019 Response to Non-Final Office Action of U.S. Appl. No. 16/236,637 dated Jun. 3, 2019.

Non-Final Office Action of U.S. Appl. No. 16/236,637 dated Dec. 12, 2019.

Mar. 12, 2020 Response to Non-Final Office Action of U.S. Appl. No. 16/236,637 dated Dec. 12, 2019.

Final Office Action of U.S. Appl. No. 16/236,637 dated Aug. 8, 2020.

Oct. 20, 2020 Response to Final Office Action of U.S. Appl. No. 16/236,637 dated Aug. 8, 2020.

Advisory Action of U.S. Appl. No. 16/236,637 dated Nov. 30, 2020.

Dec. 18, 2020 Notice of Appeal of U.S. Appl. No. 16/236,637.

Mar. 18, 2021 Appeal Brief of U.S. Appl. No. 16/236,637.

Aug. 3, 2021 Notice of Allowance of U.S. Appl. No. 16/236,637.

* cited by examiner

METHODS AND APPARATUS FOR REDUCING MOBILE TELEPHONE POWER CONSUMPTION AND/OR RADIATION EXPOSURE

The present application is a continuation of and claims priority to U.S. patent application Ser. No. 16/236,637 filed Dec. 30, 2018, and entitled "METHODS AND APPARATUS FOR REDUCING MOBILE TELEPHONE POWER CONSUMPTION AND/OR RADIATION EXPOSURE", which claims priority to and the benefit of U.S. Provisional Patent Application No. 62/612,422, filed Dec. 30, 2017, and titled "METHODS AND APPARATUS FOR REDUCING MOBILE TELEPHONE POWER CONSUMPTION AND/OR RADIATION EXPOSURE," each of which is hereby incorporated herein by reference in its entirety for all purposes.

FIELD

The present application relates to mobile telephones, and more particularly to methods and apparatus for reducing mobile telephone power consumption and/or radiation exposure.

BACKGROUND

Mobile telephones now perform many functions in addition to placing and receiving telephone calls. Mobile telephones may be used to send and receive email, provide driving directions, track exercise or food intake, order products, make travel reservations, monitor and control remote cameras and heating systems, or the like. The use of these additional functions may greatly increase power consumption of mobile telephones, requiring the mobile telephones to be recharged more frequently.

Methods for reducing power consumption of mobile telephone are desired.

SUMMARY

In some embodiments, a method of reducing power consumption by a mobile telephone includes (1) providing a mobile telephone including a processor, an antenna, and a memory having computer program code; and (2) employing the processor of the mobile telephone and computer program code to (a) check signal strength at the mobile telephone of a signal from a cellular tower; (b) determine if the signal strength from the cellular tower is below a predetermined threshold; (c) in response to the signal strength from the cellular tower being below the predetermined threshold, initiate a reduced power sequence in which the mobile telephone repeatedly turns off transmission by the antenna of the mobile telephone for a first time period and turns on transmission by the antenna of the mobile telephone for a second time period; (d) determine if the signal strength from the cellular tower is above the predetermined threshold; and (e) in response to the signal strength from the cellular tower being above the predetermined threshold, terminate the reduced power sequence.

In some embodiments, a method of reducing power consumption by a mobile telephone includes (1) providing a mobile telephone including a processor, an antenna, and a memory having computer program code; and (2) employing the processor of the mobile telephone and computer program code to (a) determine if the mobile telephone is in a vehicle; and (b) in response to the mobile telephone being in a vehicle, initiate a reduced power sequence in which the mobile telephone repeatedly turns off transmission by the antenna of the mobile telephone for a first time period and turns on transmission by the antenna of the mobile telephone for a second time period.

In some embodiments, a mobile telephone includes a processor, a transmitter circuit coupled to the processor, an antenna coupled to the transmitter circuit, and a memory coupled to the processor, the memory having computer program code stored therein, wherein executing the computer program code by the processor causes the processor to (1) check a received signal strength at the mobile telephone of a signal from a cellular tower; (2) responsive to the received signal strength of the signal from the cellular tower being below a predetermined threshold, initiate a reduced power sequence in which the mobile telephone repeatedly turns off the transmitter circuit of the mobile telephone for a first time period and turns on the transmitter circuit of the mobile telephone for a second time period; and (3) responsive to the reduced power sequence being initiated and the received signal strength of the signal from the cellular tower being above the predetermined threshold, terminate the reduced power sequence.

In some embodiments, a method of reducing power consumption by a mobile telephone includes (1) providing the mobile telephone including a processor, a transmitter circuit coupled to the processor, an antenna coupled to the transmitter circuit, and a memory coupled to the processor, the memory having computer program code stored therein; and (2) executing, by the processor of the mobile telephone, the computer program code to cause the processor to (a) check a received signal strength at the mobile telephone of a signal from a cellular tower; (b) determine if the received signal strength of the signal from the cellular tower is below a predetermined threshold; (c) in response to the received signal strength of the signal from the cellular tower being below the predetermined threshold, initiate a reduced power sequence in which the mobile telephone repeatedly turns off the transmitter circuit of the mobile telephone for a first time period and turns on the transmitter circuit of the mobile telephone for a second time period; (d) determine if the received signal strength of the signal from the cellular tower is above the predetermined threshold; and (e) in response to the received signal strength of the signal from the cellular tower being above the predetermined threshold, terminate the reduced power sequence.

In some embodiments, a method of reducing power consumption by a mobile telephone includes (1) providing the mobile telephone including a processor, a transmitter circuit coupled to the processor, an antenna coupled to the transmitter circuit, and a memory coupled to the processor and having computer program code stored therein; and (2) employing the processor of the mobile telephone and computer program code to (a) determine if the mobile telephone is in a vehicle; and (b) in response to the mobile telephone being in the vehicle, initiate a reduced power sequence in which the mobile telephone repeatedly turns off the transmitter circuit of the mobile telephone for a first time period and turns on the transmitter circuit of the mobile telephone for a second time period.

Other features and aspects of the present invention will become more fully apparent from the following detailed description, the appended claims, and the accompanying drawings.

DETAILED DESCRIPTION

With the increased use of mobile telephones to perform functions such as sending and receiving emails, browsing websites, providing driving directions, tracking exercise, monitoring and/or controlling remote appliances, or the like, mobile telephone power consumption has increased. In addition, increased communications and control by mobile telephones has increased the amount of time mobile telephones emit radiation.

Mobile telephones emit electromagnetic radiation when communicating over a cellular network. The amount of radiation emitted varies, with larger amounts of radiation typically being emitted when a mobile telephone is indoors, further away from a cellular tower, or otherwise located in a poor signal strength area in relation to a cellular network (e.g., an area where received signal strength is week). For example, larger amounts of radiation may be emitted by a mobile telephone when the mobile telephone is used within a vehicle. The metal frame of the vehicle may trap (e.g., reflect) radiation, exposing occupants to more radiation from the mobile telephone, and the mobile telephone may emit more radiation when within a vehicle because the metal frame of the vehicle degrades cellular reception (causing the mobile telephone to increase transmit power (e.g., emit more radiation) to maintain a connection).

In one or more embodiments of the invention, methods and apparatus are provided for reducing exposure of a user to radiation from a mobile telephone while still allowing the user to communicate via a cellular network. In some embodiments, a mobile telephone is programmed so as to initiate a reduced power sequence on the mobile telephone to preserve battery life and/or reduce radiation exposure of a user of the mobile telephone. For example, the mobile telephone may be programmed to repeatedly switch between a low radiation mode, such as airplane mode, and a normal mode of operation during a reduced power sequence.

Figure 1:
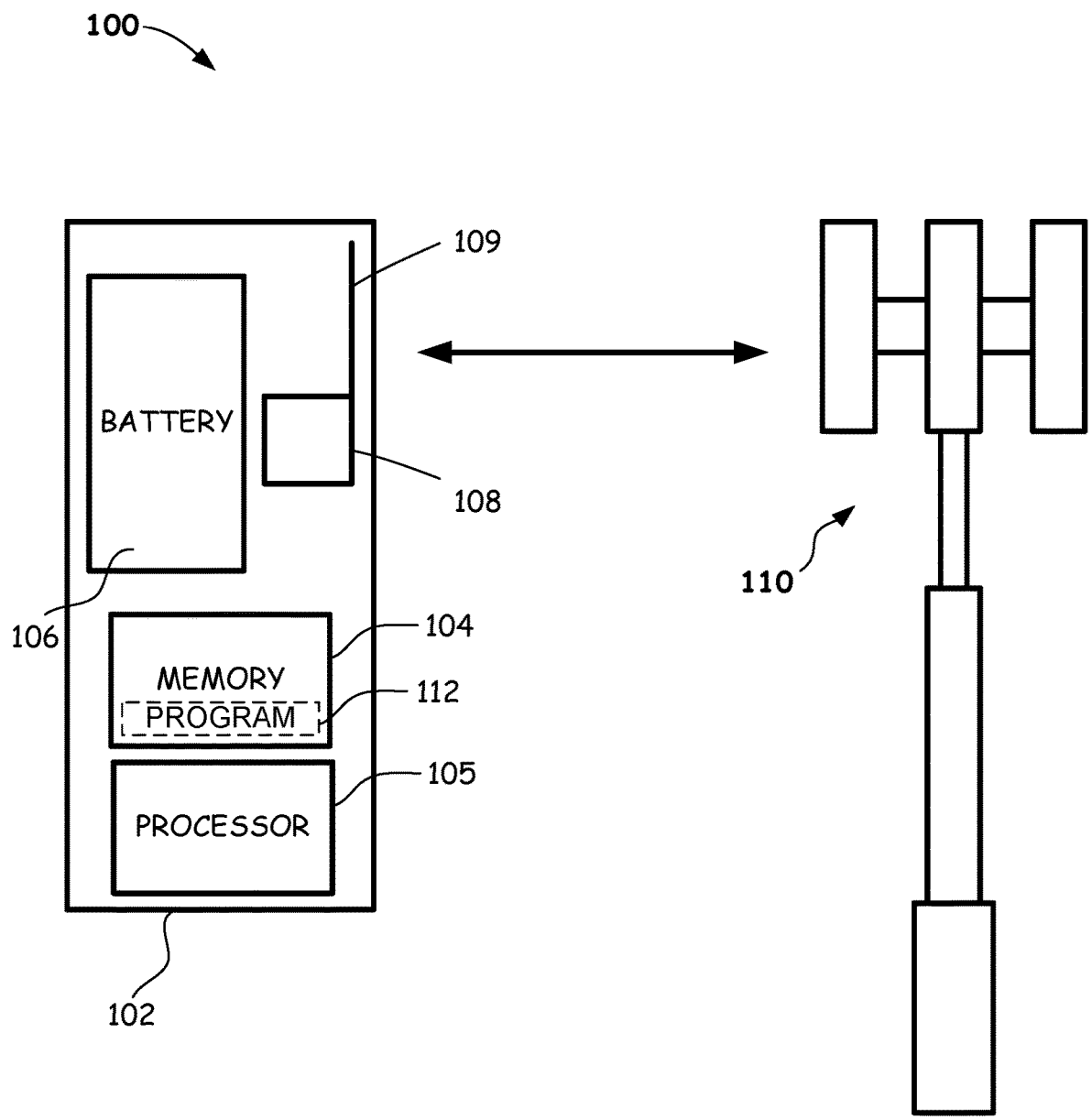
FIG. 1 is a block diagram of an example system for reducing power consumption of a mobile telephone in accordance with one or more embodiments provided herein.

FIG. 1 is a block diagram of an example system 100 for reducing power consumption of a mobile telephone 102 in accordance with one or more embodiments provided herein. With reference to FIG. 1, mobile telephone 102 includes, among other components, a memory 104, a processor 105, a battery 106, a transmitter circuit 108, and an antenna 109 for communicating with a cellular tower 110. Mobile telephone 102 may communicate information, such as data and/or voice, to or receive information from cellular tower 110 using antenna 109 to transmit or to receive the information. In various alternative embodiments, separate antennas may be used for transmit and receive operations. Cellular tower 110 may be part of a larger cellular network that allows mobile telephone 102 to communicate with other mobile telephones, browse and/or send and receive information over the world wide web and/or the Internet, or the like.

Memory 104 may include random access memory (RAM), read only memory (ROM) or any other suitable memory type. In some embodiments, memory 104 includes computer program code or instructions 112, such as one or more applications or "apps" executable by processor 105, for carrying out one or more of the methods and/or sequences described herein. For example, the computer program code or instructions may cause the mobile telephone 102 to enter or initiate a reduced power sequence in response to a predetermined condition such as, but not limited to, when the mobile telephone 102 is in a travelling car, when mobile telephone 102 has a poor connection to a cellular network, at times when mobile telephone 102 is not typically used (e.g., based on call history, calendar information, location of the mobile telephone and/or user, etc.). Memory 104 may be part of processor 105 or separate from processor 105. In various embodiments memory 104 is communicatively coupled to processor 105. Processor 105 may be, for example, a microprocessor, embedded processor, microcontroller, central processing unit, etc.

Figure 2:
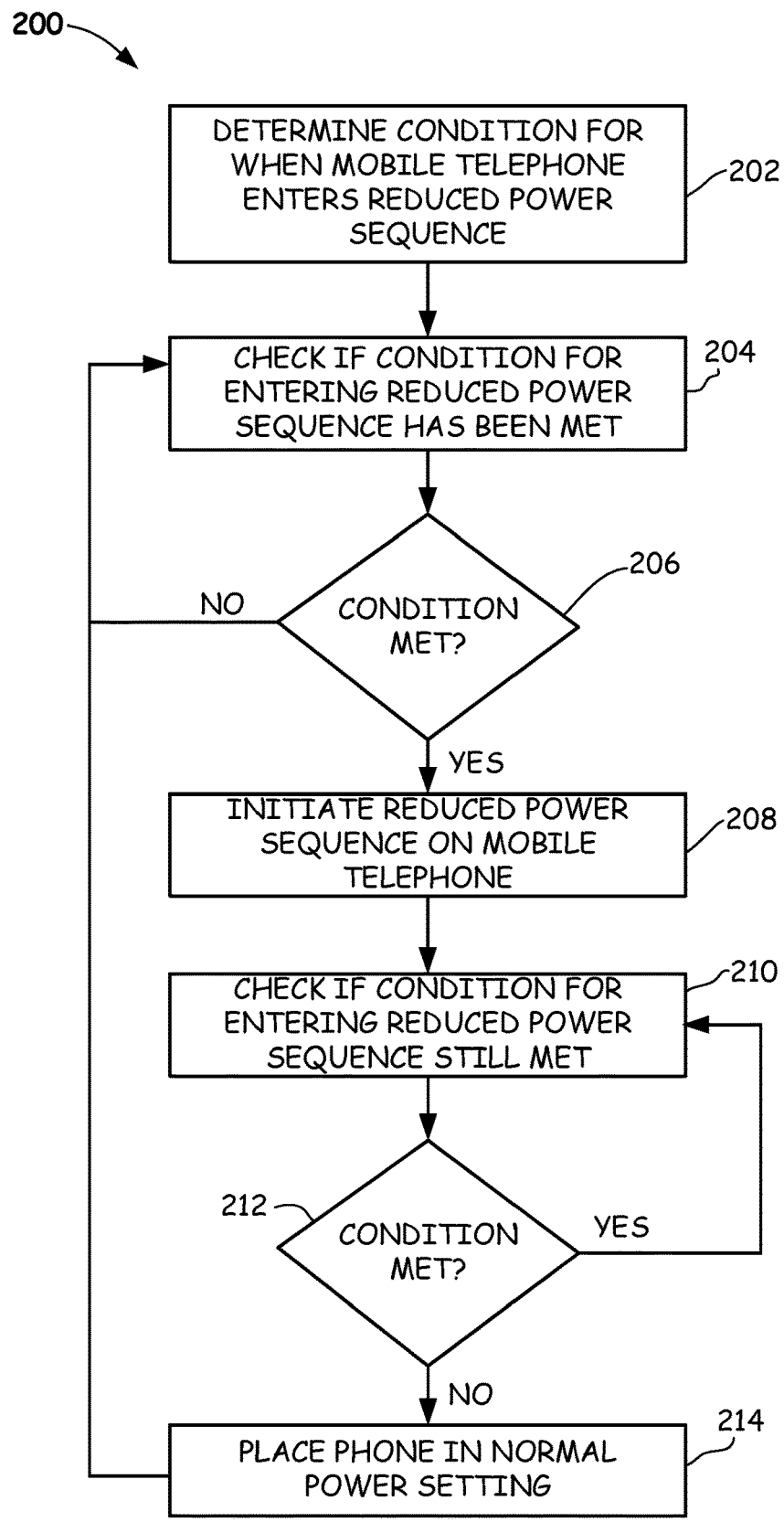
FIG. 2 is a flowchart of an example method for reducing power consumption of a mobile telephone provided in accordance with one or more embodiments herein.

FIG. 2 is a flowchart of an example method 200 for reducing power consumption of mobile telephone 102 provided in accordance with one or more embodiments herein. All or a portion of method 200 may be implemented in computer program code stored in memory 104 of mobile telephone 102, for example. This may include, for example, execution of the computer program code stored in memory 104 in cooperation with various circuit components of mobile telephone 102.

With reference to FIG. 2, method 200 begins in block 202 at which a condition is determined that will cause mobile telephone 102 to initiate a reduced power sequence that may reduce power consumption of mobile telephone 102 (and/or reduce exposure of a user of mobile telephone 102 to cellular radiation from mobile telephone 102). For example, a user of mobile telephone 102 may specify when mobile telephone 102 is to be placed into a reduced power sequence. Alternatively, a default condition may be employed. Example conditions for entering a reduced power sequence include, but are not limited to:

1. when a user of mobile telephone 102 wants to enter a reduced power sequence (e.g., when the user knows he/she will not be receiving many calls, when the user wants to save battery life, when the user wants to reduce his/her exposure to radiation from mobile telephone 102, etc.);
2. when mobile telephone 102 is in a vehicle (e.g., a car, truck, train, airplane, etc., based on, for example, one or more location-determining subsystems such as internal accelerometers, or internal global positioning system (GPS) receiver and processing circuitry that produces data that indicates mobile telephone 102 is changing position at or above a predetermined rate/speed);
3. when mobile telephone 102 is at particular location (e.g., a particular office building, a church, a school, a museum, or any other location, a user's home, based on GPS data collected and/or produced by mobile telephone 102);
4. a time determined based on usage patterns of the user's mobile phone 102 (e.g., call history, previous times the user has selected to enter the reduced power sequence, scheduled meetings present on a calendar stored on, or accessible by, mobile telephone 102, etc.);
5. when cellular reception by mobile telephone 102 is poor (e.g., below a predetermined, default or user-specified threshold);
6. time of day, such as during work hours (e.g., 9 am-5 pm), in the evening (e.g., after 7 or 8 pm), or the like; and/or
7. traffic patterns and/or road conditions (e.g., when a user's mobile phone 102 is in a traffic jam or on a detour).

In Block 204, mobile telephone 102 determines if the condition for entering a reduced power sequence has been satisfied. In Block 206, if the condition has not been met, method 200 returns to Block 204 to repeat checking the status of the condition; otherwise, method 200 proceeds to Block 208.

In Block 208, mobile telephone 102 initiates and/or enters a reduced power sequence. In some embodiments, the reduced power sequence may be a sequence of repeatedly placing mobile telephone 102 in a low power level for a first predetermined time period during which mobile telephone 102 emits little or no cellular radiation, followed by a normal power level for a second predetermined time period during which mobile telephone 102 emits cellular radiation at a level typical of its normal operation. For example, in the low power level, mobile telephone 102 may be placed in an airplane mode in which cellular antenna 109 emits little or no cellular radiation. Alternatively, cellular antenna 109 may emit a non-zero amount of cellular radiation that is lower than the amount of radiation emitted by mobile telephone 102 during normal cellular communications.

Figure 3:
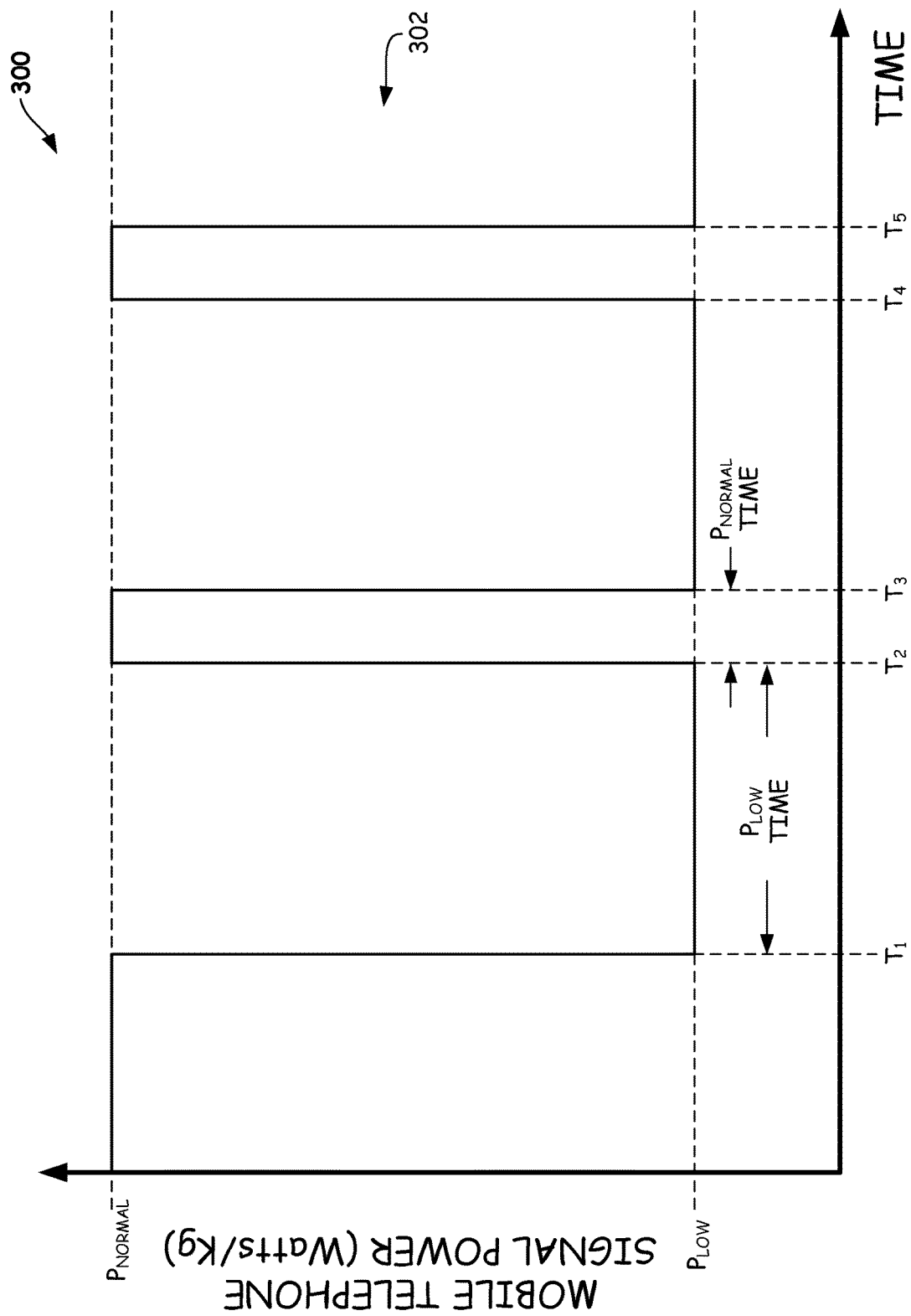
FIG. 3 illustrates an example graph of mobile telephone signal strength versus time during an example reduced power sequence provided in accordance with the present embodiments.

FIG. 3 illustrates an example graph 300 of mobile telephone signal strength (e.g., transmit power) versus time during an example reduced power sequence 302 provided in accordance with the present embodiments. With reference to FIG. 3, prior to time $T_1$, mobile telephone 102 operates in a normal mode (e.g., with airplane mode off) at a transmit power of $P_{NORMAL}$. Transmit power $P_{NORMAL}$ may vary in magnitude based on the received signal strength from cellular tower 110. For example, when the received signal strength from cellular tower 110 is strong, transmit power $P_{NORMAL}$ for mobile telephone 102 may be lower than when the received signal strength from cellular tower 110 is weak, as mobile telephone 102 will increase its output signal (e.g., transmit power) to maintain communications with cellular tower 110.

At time $T_1$, the reduced power sequence 302 begins. Between times $T_1$ and $T_2$, the cellular power level emitted by cellular antenna 109 is reduced to a low level transmit power PLOW. In some embodiments, PLOW may be at or near zero. For example, mobile telephone 102 may be placed in an airplane mode. Alternatively, the amount of power emitted by cellular antenna 109 may be reduced to a non-zero value below that of $P_{NORMAL}$ (e.g., reduced to 75%, 50%, 25%, 10%, 5% or even 1% or less of $P_{NORMAL}$).

Between times $T_2$ and $T_3$, mobile telephone 102 returns to its normal mode of operation, emitting a normal power level signal $P_{NORMAL}$ (e.g., a signal with normal transmit power). For example, in some embodiments, airplane mode may be switched off. Between times $T_3$ and $T_4$, the cellular power level (e.g., transmit power) emitted by cellular antenna 109 is reduced to a low level transmit power PLOW again. Between times $T_4$ and $T_5$, the cellular transmit power level emitted by cellular antenna 109 is increased to a normal transmit power level $P_{NORMAL}$. The above process of reducing output (e.g., transmit) power level of cellular telephone 102 followed by returning output power level of mobile telephone 102 to normal may be repeated numerous times (e.g., 5, 10, 50, 100, 1000, etc.). For example, the above process may be repeated while mobile telephone 102 is present within a moving vehicle, while the received signal strength from cellular tower 110 is below a predetermined threshold, while mobile telephone 102 is at a predetermined location (e.g., at the user's home, at a church, at a concert venue, at a restaurant, at a work location, etc.).

As stated, and as shown in FIG. 3 for example, during a reduced power sequence, mobile telephone 102 may be switched repeatedly between a low transmit power level of operation and a normal transmit power operation. In some embodiments, each low transmit power level time period during a reduced power sequence may be of the same length (e.g., $T_2-T_1$ may be the same as $T_4-T_3$, etc.). Alternatively, in some embodiments, one or more low transmit power level time periods during a reduced transmit power sequence may be of a different length (e.g., $T_2-T_1$ may be different than $T_4-T_3$, etc.). For example, the length of each low transmit power level time period within a reduced power sequence may vary (e.g., increase, decrease, change based on a linear or non-linear function such as a sine, cosine, square, cube or other similar function, etc.).

In some embodiments, each normal transmit power level time period during a reduced power sequence may be of the same length (e.g., $T_3-T_2$ may be the same as $T_5-T_4$, etc.). Alternatively, in some embodiments, one or more normal transmit power level time periods during a reduced power sequence may be of a different length (e.g., $T_3-T_2$ may be different than $T_5-T_4$, etc.). For example, the length of each normal transmit power level time period within a reduced power sequence may vary (e.g., increase, decrease, change based on a linear or non-linear function such as a sine, cosine, square, cube or other similar function, etc.).

In one or more embodiments, the low power level time periods and normal power level time periods during a reduced power sequence may be of similar lengths. Alternatively, the low power time periods and normal power level time periods during a reduced power sequence may be of different lengths. For example, the low power level time periods and normal power level time periods during a reduced power sequence may be of similar lengths. Alternatively, low power level time periods may be longer than the normal power level time periods during a reduced power sequence, or vice versa. In some embodiments, the low power level time periods may be 60% or more of a reduced power sequence (e.g., during a reduced power sequence, mobile telephone 102 may be in a low power level 60% or more of the time). In other embodiments, the low power level time periods may be 70%, 80%, 90% or 95% or more of a reduced power sequence. For example, mobile telephone 102 may be placed at a normal power level just long enough to retrieve data (e.g., emails, voicemails, text messages, etc.). In some embodiments, the length of time mobile telephone 102 is in a normal power level is based on how long it takes to connect to cellular tower 110 and retrieve any desired data (e.g., emails, voicemails, text messages, etc.), which may vary based on signal strength from cellular tower 110.

Figure 4:
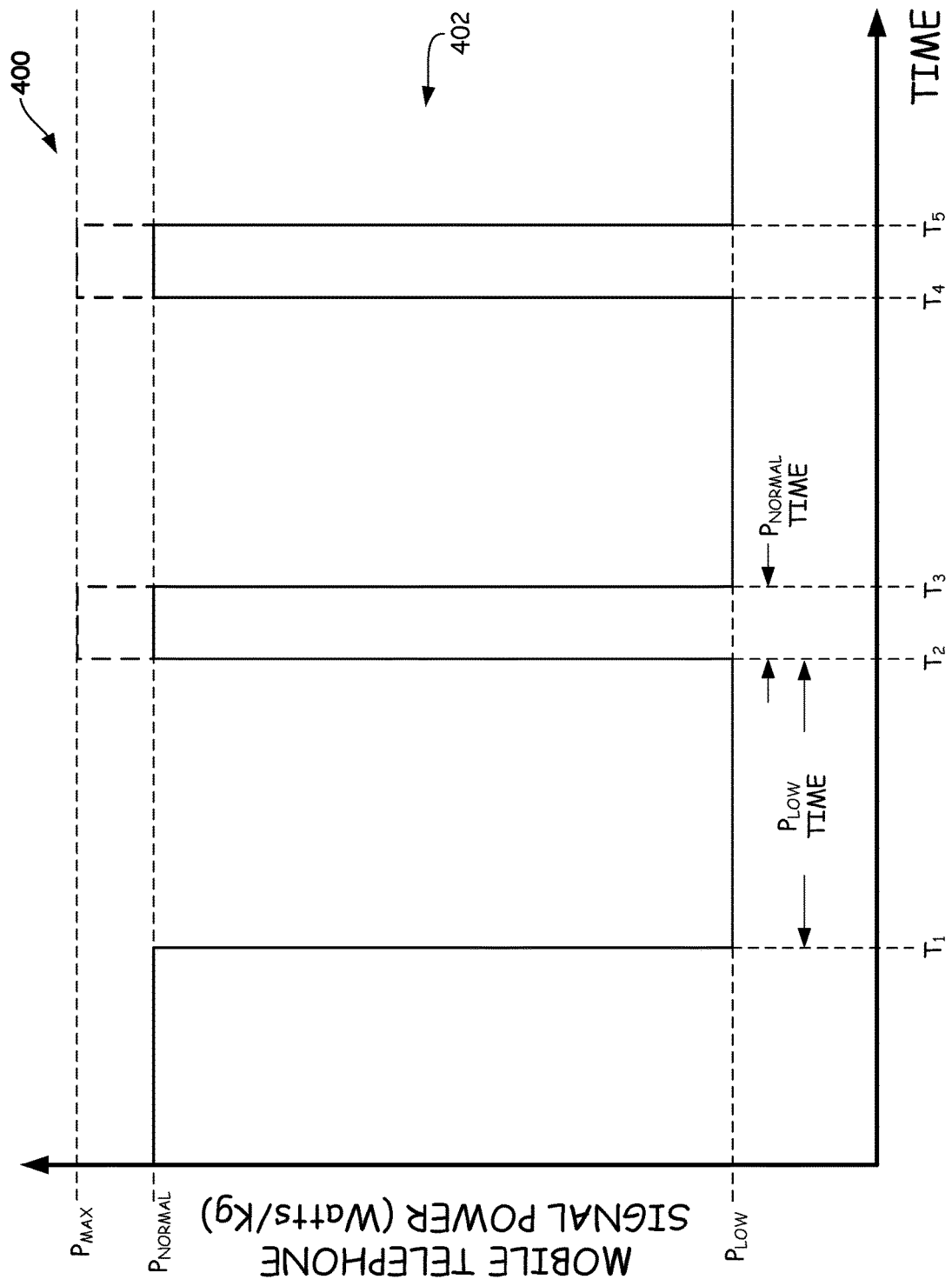
FIG. 4 illustrates an additional example graph of mobile telephone signal strength versus time during an example reduced power sequence provided in accordance with the present embodiments.

In some embodiments, during one or more normal power level time periods of a reduced power sequence, the power output by mobile telephone 102 may be increased above its normal transmit power level (e.g., above $P_{NORMAL}$ up to a maximum level $P_{MAX}$ that can be output by mobile telephone 102). For example, during a reduced power sequence, because mobile telephone 102 is only outputting cellular radiation during a fraction of the reduced power sequence, on average, the amount of cellular radiation output by mobile telephone 102 is lower than normal. This may allow mobile telephone 102 to be operated at a higher power level than would normally be permissible. For example, FIG. 4 illustrates an example graph 400 of mobile telephone signal strength (e.g., transmit power) versus time during an example reduced power sequence 402 provided in accordance with the present embodiments, in which the power output by mobile telephone 102 is increased above its normal power level (to PMAX) during normal power level time periods of reduced power sequence 402 (e.g., one or more of time periods $T_2$ to $T_3$, $T_4$ to $T_5$, etc.).

The maximum specific absorption rate (SAR) for mobile telephone radiation is about 1.6 Watts of energy absorbed per kilogram of body weight. In some embodiments, the power levels used by mobile telephone 102 during one or more normal power level time periods of a reduced power sequence may be up to 1.6 Watts/Kg SAR or higher (e.g., 1.6 Watts/Kg, 1.8 Watts/Kg, 2.0 Watts/Kg, etc.), whereas the power levels used by mobile telephone 102 during one or more low power level time periods of a reduced power sequence maybe may be less than about 0.2 Watts/Kg SAR, in other embodiments less than about 0.1 Watts/Kg SAR and in other embodiments less than about 0.05 Watts/Kg SAR. Other power levels may be used.

Returning to FIG. 2, once the reduced power sequence is initiated on mobile telephone 102 (Block 208), in Block 210, mobile telephone 102 checks to determine whether the condition for entering the reduced power sequence still exists. If the condition for entering the reduced power sequence still exits, in Block 212, mobile telephone 102 remains in the reduced power sequence and returns to Block 210 to re-check whether the condition for entering the reduced power sequence still exists; otherwise, in Block 214, mobile telephone 102 exits the reduced power sequence and returns to a normal power setting (and method 200 returns to Block 204 to determine whether the condition for entering the reduced power sequence now exists).

Figure 5:
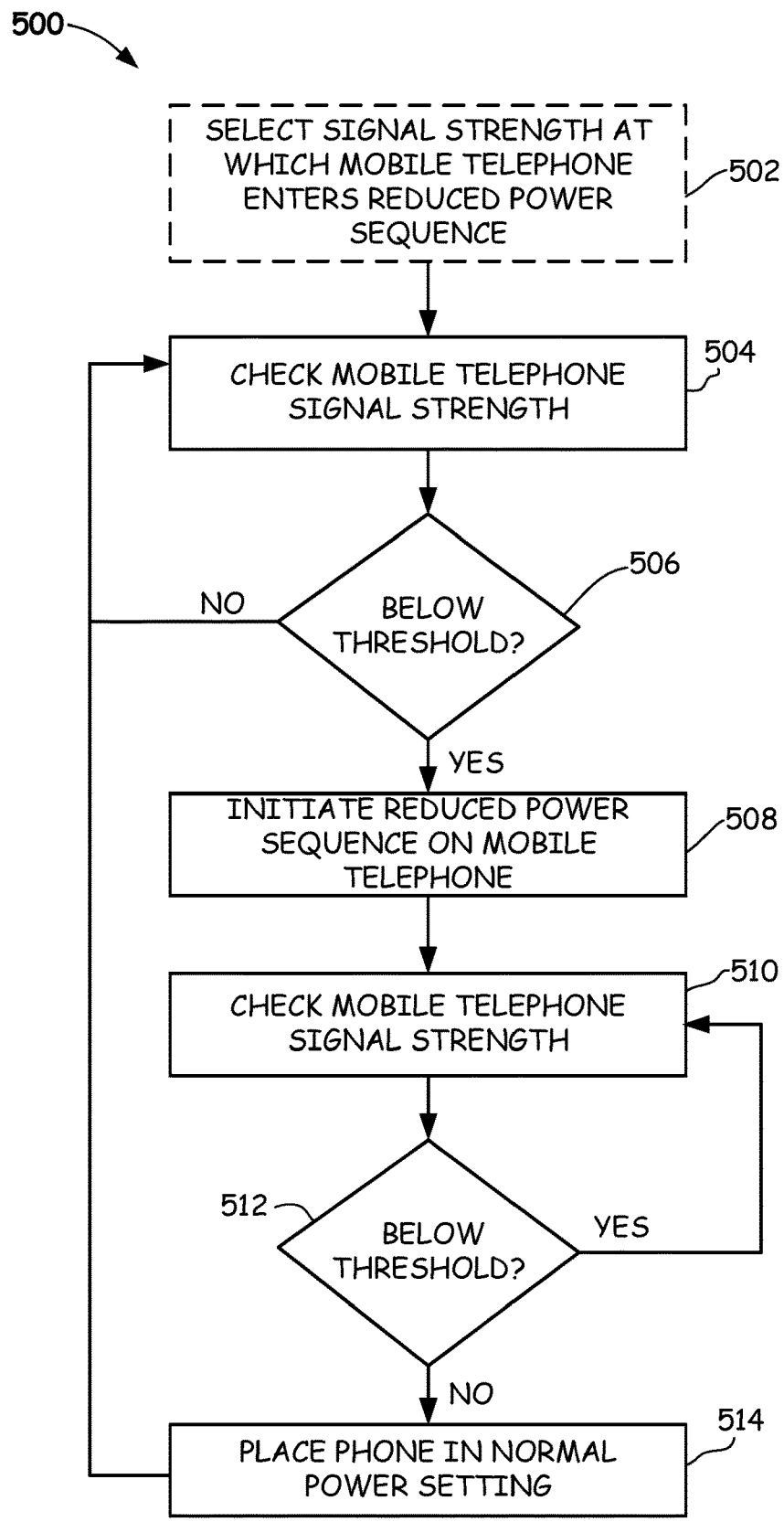
FIG. 5 is a flowchart of an additional example method for reducing power consumption of a mobile telephone provided in accordance with one or more embodiments herein.

FIG. 5 is a flowchart of an example method 500 for reducing power consumption of mobile telephone 102 provided in accordance with one or more embodiments herein. All or a portion of method 500 may be implemented in computer program code stored in memory 104 of mobile telephone 102, for example.

With reference to FIG. 5, method 500 begins in block 502 at which a user may optionally determine what signal strength from cellular tower 110 will cause mobile telephone 102 to enter a reduced power sequence. For example, when the connection strength between a mobile telephone and a cellular tower is poor, the mobile telephone typically outputs cellular radiation at its maximum level to maintain the cellular connection. This reduces battery life of the mobile telephone, and exposes a user of the mobile telephone to more cellular radiation. In such instances, it may be desirable to only connect to the cellular tower occasionally (e.g., to save battery power, reduce radiation exposure to a user, etc.). In some embodiments, a user may specify a level at which mobile telephone 102 enters a reduced power sequence. For example, the user may specify mobile telephone 102 should enter a reduced power sequence if it has 1 bar of service, 2 bars of service or a specific received signal strength connection with cellular tower 110.

In Block 504, mobile telephone 102 checks the signal strength from cellular tower 110. In Block 506, if the signal strength from cellular tower 110 is above a predetermined threshold (e.g., specified by the user or a preset level), mobile telephone 102 does not enter a reduced power sequence and method 500 returns to Block 504 to again check signal strength. This process repeats while signal strength is sufficient.

If in Block 506, the signal strength from cellular tower 110 is below a predetermined threshold, in Block 508, mobile telephone enters into a reduced power sequence (e.g., as describe previously and/or further below).

In Block 510, mobile telephone 102 checks the signal strength from cellular tower 110. In Block 512, if the signal strength from cellular tower 110 is below the predetermined threshold, method 500 returns to Block 510 to recheck the signal strength from cellular tower 110 (while the reduced power sequence continues). This process repeats while mobile telephone 102 is executing the reduced power sequence (or until the reduced power sequence is overridden in some embodiments as described below).

If in Block 512 the signal strength from cellular tower 110 is above a predetermined threshold (e.g., specified by the user or a preset level) mobile telephone 102 exits the reduced power sequence and mobile telephone 102 returns to a normal power setting in Block 514 (e.g., turns off airplane mode or otherwise enables normal operation of cellular antenna 109 and/or transmitter circuit 108). Method 500 then returns to Block 504 to again check signal strength. This process repeats while signal strength is sufficient.

Figure 6:
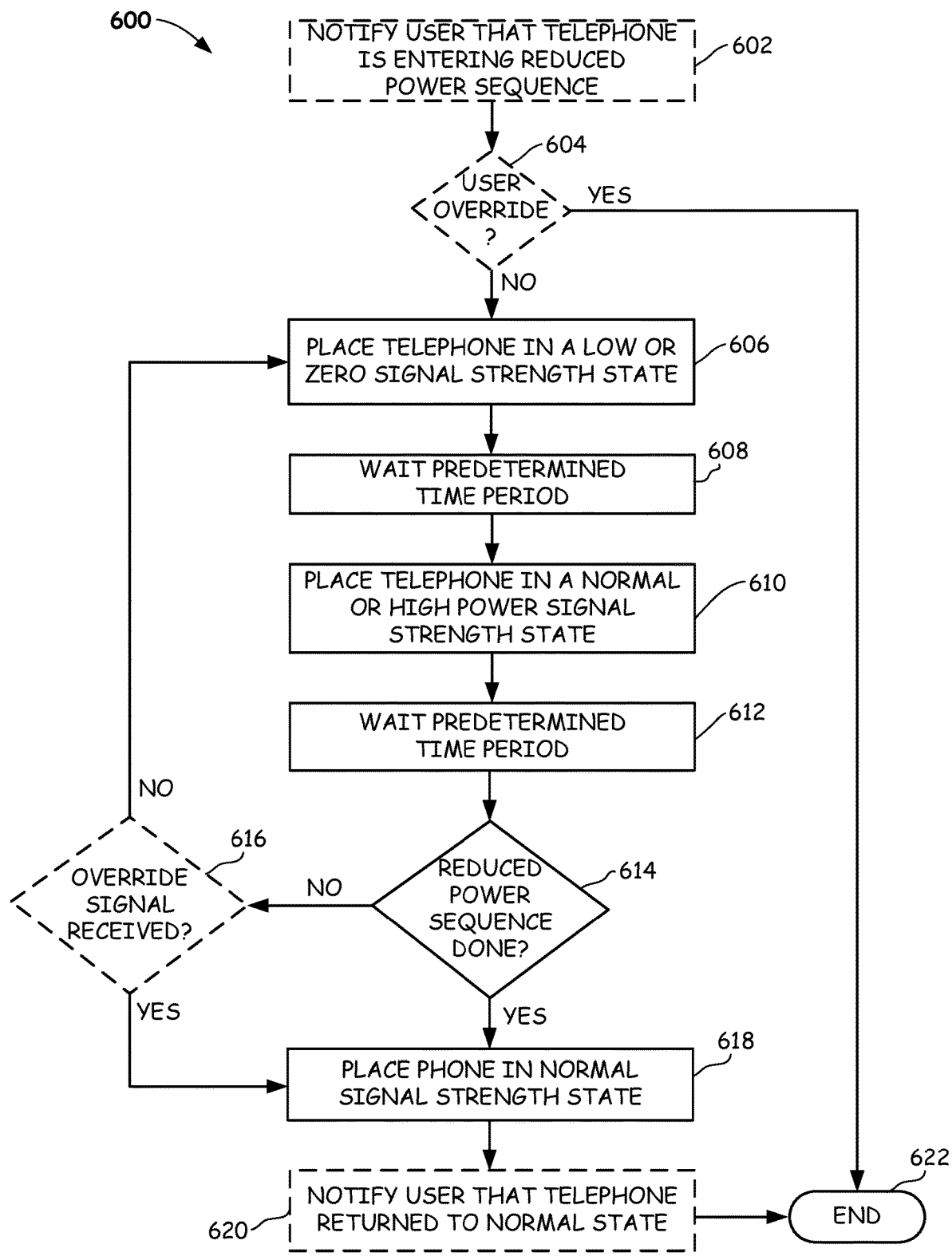
FIG. 6 is a flowchart of an example reduced power sequence for a mobile telephone provided in accordance with one or more embodiments herein.

FIG. 6 is a flowchart of an example reduced power sequence 600 for mobile telephone 102 provided in accordance with one or more embodiments herein. All or a portion of reduced power sequence 600 may be implemented in computer program code stored in memory 104 of mobile telephone 102, for example.

With reference to FIG. 6, reduced power sequence 600 begins in block 602 at which mobile telephone 102 optionally may notify a user of mobile telephone 102 that mobile telephone 102 is about to enter a reduced power sequence (e.g., by vibrating, playing an audio alert, displaying a message, any combination of these, etc.). In some embodiments, during such a reduced power sequence, phone calls, voicemails, emails, text messages, etc., may only be received during the portions of the reduced power sequence when mobile telephone 102 is in a normal or high power signal state (as described below). Therefore, in some embodiments, a user may wish to be notified that mobile telephone 102 is about to enter a reduced power sequence. In such embodiments, processor 105 may execute computer program code 112 stored in memory 104 to generate a notification to the user. Such notifications may include, but are not limited to, displaying a message, generating a sound, or causing mobile telephone 102 to vibrate. In such embodiments, the user optionally may be able to override entry of mobile telephone 102 into a reduced power sequence. For example, in Block 604, mobile telephone 102 may determine whether the user wishes to not enter the reduced power sequence (e.g., by prompting the user, if the user pushes a button or icon within a predetermined time period such as 10 seconds, 20 seconds, etc., if the user presses a home or similar button on mobile telephone 102, or the like). If the user wishes to not continue with reduced power sequence 600, reduced power sequence 600 ends at Block 622; otherwise reduced power sequence 600 proceeds to Block 606.

At Block 606, mobile telephone 102 enters a low or zero signal strength state 606. For example, the amount of power applied to antenna 109 may be reduced by mobile telephone 102. In some embodiments, mobile telephone 102 may enter an airplane mode in which transmitter circuit 108 and/or antenna 109 is disabled.

At Block 608, mobile telephone 102 waits a predetermined time period (e.g., 30 seconds, 50 seconds, 1 minute, 2 minutes, 5 minutes, 10 minutes, or some other time period which may or may not be specifiable by the user of the mobile telephone). At Block 610, mobile telephone 102 switches back to a normal or a higher than normal power signal strength state (e.g., by turning airplane mode off or otherwise increasing transmit power delivery to antenna 109). At Block 612, mobile telephone 102 waits a predetermined time period (e.g., 1 second, 5 seconds, 10 seconds, 30 seconds, 1 minute, 2 minutes or some other time period which may or may not be specifiable by the user of the mobile telephone). In some embodiments, mobile telephone 102 waits long enough for a connection to be established with a cellular tower such as cellular tower 110 and/or for any voicemails, emails, text messages, etc., to be downloaded. In Block 614, mobile telephone 102 determines if the reduced power sequence has completed enough low power/high power cycles (e.g., if the reduced power sequence of low/high power cycles has run for a user specified or otherwise predetermined time period, if the condition that caused the reduced power sequence to be initiated no longer exits, etc.). If the low/high power cycles of reduced power sequence 600 are not complete, in Block 616, mobile telephone 102 may optionally determine if an override condition exists. In some embodiments, an override condition may exist if a user of mobile telephone 102 presses a button or icon on mobile telephone 102, if the user presses a home or similar button on mobile telephone 102, or the like. In one or more embodiments, a third party such as a friend, co-worker, employer, client, family member, medical staff, the police or the like, may initiate the override condition by sending an override signal to mobile telephone 102 that is received during Block 610, for example. For example, a voicemail, text message, email, or other communication may contain an embedded code or other trigger that notifies mobile telephone 102 that it should abort the reduced power sequence. Alternatively, certain contacts (e.g., telephone numbers on a favorites list or another user specified group) may create an override condition whenever any of the contacts communicate with mobile telephone 102 (e.g., as identified by the telephone number of the person making a call or sending a text message, based on an email address, etc.). If an override condition exists at Block 616, method 600 proceeds to Block 618 where mobile telephone 102 is operated in a normal mode (e.g., with airplane mode off or antenna 109 and transmitter circuit 108 otherwise enabled). The user may be optionally notified that the reduced power sequence has ended (Block 620), such as by displaying a message, generating a sound, causing mobile telephone 102 to vibrate, etc., and reduced power sequence 600 ends (Block 622). In some embodiments, when an override condition at Block 616 is caused by a third party sending an override signal, mobile telephone 102 may notify the third party that mobile telephone 102 is now active and able to receive phone calls, texts, emails, etc., such as by calling, texting, emailing, or otherwise contacting the third party.

If an override signal is not received at Block 616, reduced power sequence 600 proceeds to Block 606 where it repeats cycling between low signal and normal/high signal strength (e.g., transmit power) states of operation of mobile telephone 102.

If it is determined in Block 614 that the reduced power sequence should end (e.g., if the reduced power sequence of low/high power cycles has run for a user specified or otherwise predetermined time period, if the condition that caused the reduced power sequence to be initiated no longer exits, etc.), reduced power sequence 600 proceeds to Block 618. In Block 618, mobile telephone 102 operates in a normal mode (e.g., with airplane mode off or antenna 109 and transmitter circuit 108 otherwise enabled). The user may be optionally notified that the reduced power sequence has ended (Block 620) and reduced power sequence 600 ends (Block 622).

In some embodiments, a user may specify one or more of the length of a reduced power sequence, the amount or percentage of time a mobile telephone is in a lower power level versus a normal/high power level during a reduced power sequence, and what factors determine whether a mobile telephone enters a reduced power sequence (e.g., time of day, location, when the user is travelling in a vehicle, etc.).

In some embodiments, certain conditions may cause mobile telephone 102 to not initiation a reduced power sequence that would otherwise be initiated (e.g., an important event on a calendar marked accordingly, an active telephone call or text exchange, or the like). For example, a calendar event may be marked with a flag or status that indicates to mobile telephone 102 that it should not enter a reduced power sequence during the event (or alternatively should enter a reduced power sequence during the event).

In some embodiments, a user may specify a signal strength at which mobile telephone 102 enters a reduced power sequence (e.g., 1 bar, 2 bar, etc., on mobile telephone 102, a specific power level or threshold of signal strength received from a cellular tower, etc.).

In one or more embodiments, different reduced power sequences may be used for different situations (e.g., a first sequence for vehicles, a second for an office, a third for home, etc.). In some embodiments, a user may customize one or more of the reduced power sequences and/or select which reduced power sequences apply to which situations.

While described primarily with regard to mobile telephones, it will be understood that reduced power sequences as described herein may be employed with other devices such as smart watches (e.g., an Apple Watch®, a Samsung Galaxy Watch, etc.), tablets, electronic readers, tablet computers, laptop computers or the like that employ cellular antennas and/or communications, to reduce power consumption and/or radiation exposure of a user of such devices.

In addition to reducing power consumption, the use of reduced power sequences as described herein may significantly reduce exposure of a user of a mobile telephone or other mobile device to cellular-related radiation. For example, during a reduced power sequence, a mobile device may only transmit electromagnetic radiation for a small fraction of the reduced power sequence.

Accordingly, while the present invention has been disclosed in connection with example embodiments thereof, it should be understood that other embodiments may fall within the spirit and scope of the invention, as defined by the following claims.

What is claims is:
1. A method of reducing power consumption by a mobile telephone comprising:
   providing an application including computer program code configured for use with a mobile telephone including a processor, an antenna, and a memory; and employing the processor of the mobile telephone and computer program code to:
   check signal strength at the mobile telephone of a signal from a cellular tower;
   determine if the signal strength from the cellular tower is below a predetermined threshold;
   in response to the signal strength from the cellular tower being below the predetermined threshold, initiate a reduced power sequence in which the mobile telephone repeatedly turns off transmission by the antenna of the mobile telephone for a first time period and turns on transmission by the antenna of the mobile telephone for a second time period;
   determine if the signal strength from the cellular tower is above the predetermined threshold; and
   in response to the signal strength from the cellular tower being above the predetermined threshold, terminate the reduced power sequence.

2. The method of claim 1, wherein the second time period is less than 50% of the first time period.

3. The method of claim 1, wherein the second time period is less than 25% of the first time period.

4. The method of claim 1, wherein the second time period is less than 10% of the first time period.

5. The method of claim 1, wherein the second time period is less than 1% of the first time period.

6. A method of reducing power consumption by a mobile telephone comprising:
   providing an application including computer program code configured for use with a mobile telephone including a processor, an antenna, and a memory; and
   employing the processor of the mobile telephone and computer program code to:
      determine if the mobile telephone is in a vehicle; and
      in response to the mobile telephone being in a vehicle, initiate a reduced power sequence in which the mobile telephone repeatedly turns off transmission by the antenna of the mobile telephone for a first time period and turns on transmission by the antenna of the mobile telephone for a second time period.

7. The method of claim 6, wherein the second time period is less than 50% of the first time period.

8. The method of claim 6, wherein the second time period is less than 25% of the first time period.

9. The method of claim 6, wherein the second time period is less than 10% of the first time period.

10. The method of claim 6, wherein the second time period is less than 1% of the first time period.

11. An application configured for use with a mobile telephone having a processor, a transmitter circuit coupled to the processor, an antenna coupled to the transmitter circuit, and a memory coupled to the processor, the application comprising:
   computer program code configured for storage in the memory of the mobile telephone and that when executed by the processor of the mobile telephone causes the mobile telephone to:
      check a received signal strength at the mobile telephone of a signal from a cellular tower;
      responsive to the received signal strength of the signal from the cellular tower being below a predetermined threshold, initiate a reduced power sequence in which the mobile telephone repeatedly turns off the transmitter circuit of the mobile telephone for a first time period and turns on the transmitter circuit of the mobile telephone for a second time period; and
      responsive to the reduced power sequence being initiated and the received signal strength of the signal from the cellular tower being above the predetermined threshold, terminate the reduced power sequence.

12. The application of claim 11, wherein the second time period is less than 50% of the first time period.

13. The application of claim 11, wherein the second time period is less than 25% of the first time period.

14. The application of claim 11, wherein the second time period is less than 10% of the first time period.

15. The application of claim 11, wherein the second time period is less than 1% of the first time period.

16. The application of claim 11, wherein execution of the computer program code by the processor further causes the mobile telephone to:
   determine whether the mobile telephone is in a vehicle; and
   responsive to the mobile telephone being in the vehicle, initiate the reduced power sequence.

17. The application of claim 11, wherein execution of the computer program code by the processor further causes the mobile telephone to:
   receive a first user input that specifies a value of the received signal strength at which the mobile telephone initiates the reduced power sequence.

18. The application of claim 11, wherein execution of the computer program code by the processor further causes the mobile telephone to:
   generate a first notification to a user responsive to determining that the reduced power sequence should be initiated.

19. The application of claim 18, wherein execution of the computer program code by the processor further causes the mobile telephone to:
   receive, responsive to the notification to the user, a second user input that instructs the mobile telephone to override an initiation of the reduced power sequence.

20. The application of claim 11, wherein execution of the computer program code by the processor further causes the mobile telephone to:
   generate a second notification to the user that the reduced power sequence has terminated.

\* \* \* \* \*